(12) United States Patent
Schmid

(10) Patent No.: US 11,643,788 B2
(45) Date of Patent: May 9, 2023

(54) QUICK-CHANGE COUPLER DEVICE AND QUICK-CHANGE COUPLER SYSTEM COMPRISING SAID QUICK-CHANGE COUPLER DEVICE

(71) Applicant: OilQuick Deutschland KG, Steindorf (DE)

(72) Inventor: Sebastian Schmid, Steindorf (DE)

(73) Assignee: OilQuick Deutschland KG, Steindorf (DE)

( * ) Notice: Subject to any disclaimer, the term of this patent is extended or adjusted under 35 U.S.C. 154(b) by 586 days.

(21) Appl. No.: 16/682,587

(22) Filed: Nov. 13, 2019

(65) Prior Publication Data
US 2020/0149243 A1 May 14, 2020

(30) Foreign Application Priority Data
Nov. 14, 2018 (DE) ...................... 10 2018 128 479.9

(51) Int. Cl.
*E02F 3/36* (2006.01)
*F16L 37/127* (2006.01)

(52) U.S. Cl.
CPC .......... *E02F 3/3622* (2013.01); *E02F 3/3627* (2013.01); *F16L 37/127* (2013.01)

(58) Field of Classification Search
CPC ....... E02F 3/3622; E02F 3/3627; E02F 3/364; E02F 3/3645
See application file for complete search history.

(56) References Cited

U.S. PATENT DOCUMENTS 5,244,047 A 9/1993 Eudy
6,154,989 A 12/2000 Kaczmarski et al.
(Continued)

FOREIGN PATENT DOCUMENTS

DE 202012009838 U1 10/2013
GB 2441322 A 3/2008
JP H1082066 A 3/1998

OTHER PUBLICATIONS

Search Result of German Application No. 10 2018 128 479.9, filed Nov. 14, 2018.

*Primary Examiner* — Saul Rodriguez
*Assistant Examiner* — Brendan P Tighe
(74) *Attorney, Agent, or Firm* — Paul D. Bianco; Stephen Bongini; Fleit Intellectual Property Law

(57) ABSTRACT

A quick-change coupler device for coupling and uncoupling implement attachments to and from construction site equipment includes a carrier assembly, first receiving members disposed on one side of the carrier assembly for receiving a first coupling member, second receiving members disposed on the other side of the carrier assembly for receiving a second coupling member, a locking unit dedicated to the second receiving members and capable of moving between a release position and a locking position, and a catch unit disposed on the carrier assembly for catching the implement attachment. To simplify coupling and to ensure an increased safety level, the catch unit comprises at least one catch hook swivel-mounted on the carrier assembly and a control unit controls swivel of the catch hook between a folded-in and a folded-out position. The control unit is actuated by the first coupling member and is actuated independently of the locking unit.

20 Claims, 3 Drawing Sheets

(56) References Cited

U.S. PATENT DOCUMENTS

| | | | |
|---|---|---|---|
| 9,382,686 B2 | 7/2016 | Friedrich | |
| 2009/0282712 A1* | 11/2009 | Pruszynski | E02F 3/365 37/468 |
| 2010/0061799 A1* | 3/2010 | Hill | E02F 3/3645 403/322.3 |
| 2010/0107456 A1* | 5/2010 | Miller | E02F 3/3663 37/468 |
| 2010/0124453 A1* | 5/2010 | Sikorski | E02F 3/3618 403/42 |
| 2010/0192425 A1* | 8/2010 | Miller | E02F 3/3618 37/468 |
| 2010/0232920 A1* | 9/2010 | Calvert | E02F 3/3663 414/723 |
| 2011/0286788 A1* | 11/2011 | Sikorski | E02F 9/26 403/315 |
| 2012/0266432 A1* | 10/2012 | Balemi | E02F 3/3622 403/376 |
| 2013/0234415 A1 | 9/2013 | Essex | |
| 2014/0308061 A1* | 10/2014 | Robl | E02F 3/364 73/849 |
| 2018/0066418 A1* | 3/2018 | Keighley | E02F 3/3663 |

* cited by examiner

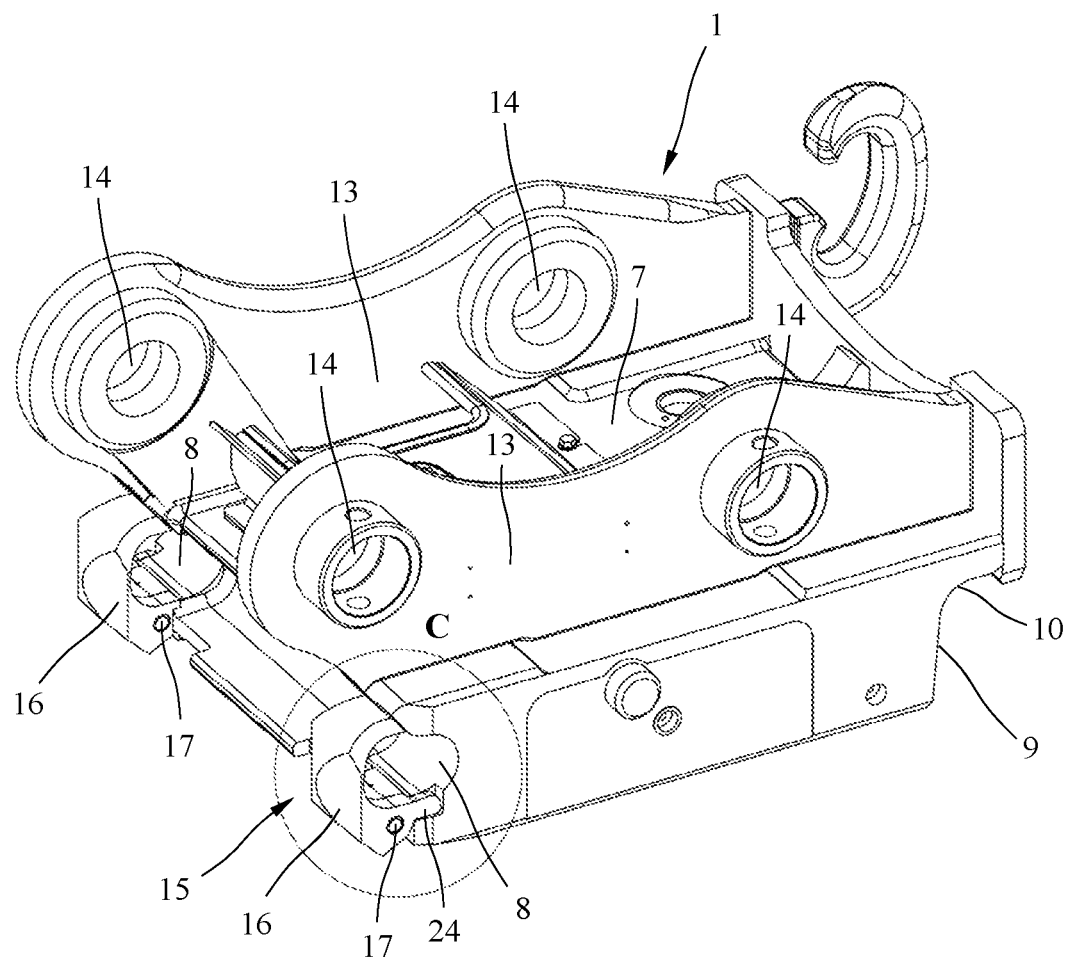
Fig. 6
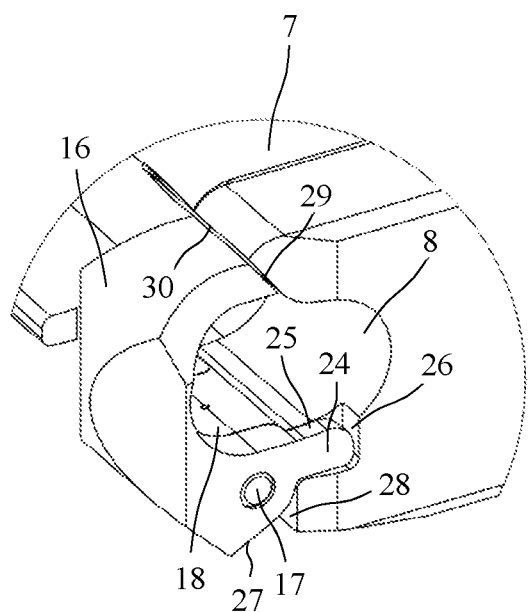 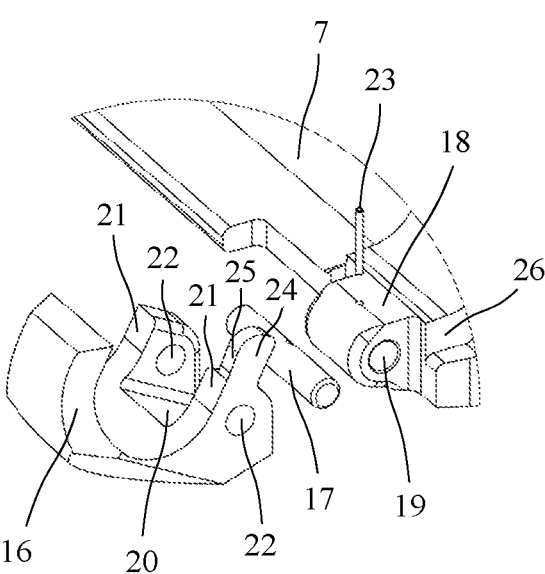
Fig. 7                    Fig. 8

QUICK-CHANGE COUPLER DEVICE AND QUICK-CHANGE COUPLER SYSTEM COMPRISING SAID QUICK-CHANGE COUPLER DEVICE

FIELD OF THE DISCLOSURE

The disclosure relates to a quick-change coupler device and to a quick-change coupler system comprising the quick-change coupler device and a dedicated adapter.

BACKGROUND

Quick-change coupler devices of this type are used to easily and conveniently couple and uncouple different implement attachments to and from construction site equipment. Using this type of quick-change coupler device allows, e.g., swivel buckets, claws, shears, compactors, magnets, hydraulic hammers or other implement attachments to be coupled to and uncoupled from, e.g., a boom of an excavator, in a few seconds and with a high safety standard from the operator's cab.

U.S. Pat. No. 6,154,989 A discloses a generic quick-change coupler device. This quick-change coupler device comprises a carrier assembly which, on one side, has first receiving members for retaining a first coupling member disposed on an implement attachment and, on the other side, second receiving members with a locking member, movable between a release position and a locking position, for releasably retaining a second coupling member. To prevent the implement attachments from falling down, which could potentially endanger people on the ground if the locking member were to be unintentionally moved into a release position, a catch unit with a hook assembly for retaining a cross bar, which interacts with counter-hooks on the implement attachment, is disposed on the carrier assembly. Since the hook assembly provided for safety purposes is integrally formed in one piece with the carrier assembly, the carrier assembly as a whole will necessarily always be affected as well whenever the hook assembly is damaged as a result of improper use. Therefore, to perform a changeover, the quick-change coupler device must be positioned especially accurately and carefully.

SUMMARY

One aspect of the disclosure relates to a compactly designed quick-change coupler device and a quick-change coupler system comprising this quick-change coupler device which allow a simplified coupling maneuver and ensure increased safety.

Useful embodiments and advantageous refinements are also disclosed.

The catch unit on the quick-change coupler device according to the present disclosure comprises at least one catch hook which is swivel-mounted on the carrier assembly and on which a control member for controlling the swivel movement of the catch hook between a folded-in and a folded-out position is disposed, said control member being designed to be actuated by the first coupling member and actuated independently of the locking unit. Via the control member, the implement attachment is able to initiate a movement of the catch hook. No separate drives are required. In addition, the control member also ensures that the catch hook can be moved into the folded-out position, in which a changeover can be made, only if the coupling member is correctly positioned in the catch hook.

In the folded-out position of the catch hook, an implement attachment can be changed by setting it on the ground, while the catch hook in the folded-in position encloses the receiving member for a coupling member. Folding in the catch hook makes for an especially compact design, which can markedly reduce the risk of potential collisions with an implement attachment. If the locking unit were to be unintentionally released, the foldable catch hook can catch an implement attachment by engaging the coupling member on the catch hook in a catch position and thereby retain the implement attachment on the quick-change coupler device. The control of the swivel movement of the catch hook takes place independently of the actuation of the locking unit by a coupling member on the implement attachment that is to be coupled to the quick-change coupler device. No additional control or actuation devices are required. The catch hook ensures that even in cases of potential operator error, an implement attachment is reliably caught. The catch hook is extremely robust and ensures a high level of safety. Furthermore, a catch hook damaged as a result of improper use can easily be replaced without requiring the replacement of the entire carrier assembly. There is no need to dismantle or replace the entire carrier assembly.

According to an especially useful embodiment of the present disclosure, the control member can be designed as an extension piece of the catch hook, which projects in the direction of the first receiving member and which has an upper control surface for abutting the coupling member which is engaging in the first receiving member. A recess for receiving the control member can be disposed on the carrier assembly when the catch hook is in the folded-in position. However, the control member can also have a different design.

The catch member can comprise one or a plurality of catch hooks which can be separated from or connected to each other. According to an especially useful embodiment, the catch member can comprise two catch hooks which are swivel-mounted on the first receiving members of the carrier assembly. The catch hooks can be designed as separate and separately swiveling catch hooks. However, they can also be connected to each other.

An especially secure retention can be ensured if the catch hook surrounds and grasps the coupling member in the form of a semicircle. On its lower face, the catch hook can have a stop surface for abutting a front-end abutment surface of the carrier assembly. On its upper end, the catch hook can have an abutment surface for abutting a complementary mating surface of the carrier assembly.

According to a robust and, from the standpoint of design, favorable embodiment, the catch hook can be swivel-mounted about a transverse axis on a connecting strip of the carrier assembly. To be able to swivel-mount the catch hook, the connecting strip can have a cross bore, and the catch hook can have suitable receiving bores for receiving the transverse axis.

Expediently, the catch hook can be pivotally mounted on the transverse axis by means of mounting bushings. In this manner, the catch hook can be hinged to the carrier assembly while ensuring low friction and reliable protection against wear. The transverse axis can be secured relative to the carrier assembly by means of a pin to prevent its dropping out and becoming twisted.

The present disclosure further relates to a quick-change coupler system which comprises a quick-change coupler device as described above and an adapter which can be coupled to the quick-change coupler device.

BRIEF DESCRIPTION OF THE DRAWINGS

Other features and advantages of the disclosure will become apparent from the following description of a preferred embodiment example with reference to the drawings. The drawings show:

FIG. 6 the quick-change coupler device of FIG. 1 with the catch member in a closed catch position;

FIG. 7 an enlarged view of area C of FIG. 6, and

FIG. 8 an enlarged exploded detail view of a catch hook.

DETAILED DESCRIPTION

Figure 1:
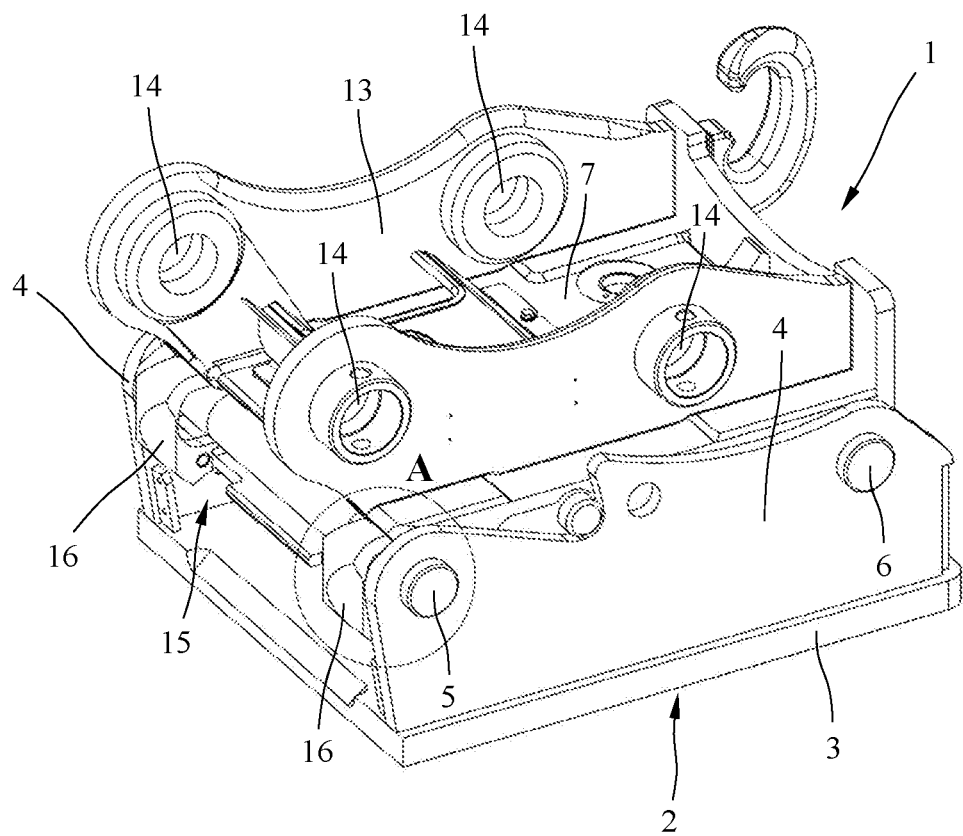
FIG. 1 a quick-change coupler system comprising a quick-change coupler device and an adapter in a coupling position.

FIG. 1 shows a quick-change coupler system for easily and conveniently coupling and uncoupling a variety of different implement attachments to and from different construction site machines, in particular, excavators, which quick-change coupler system comprises a quick-change coupler device 1 and a dedicated adapter 2. Using this type of quick-change coupler system allows, e.g., swivel buckets, claws, shears, magnets, compactors, hydraulic hammers or other mechanical and/or hydraulic implement attachments to be easily and conveniently coupled to and uncoupled from a boom or another implement attachment part of an excavator or another construction site vehicle from the operator's cab.

The adapter 2, which can be mounted on an implement attachment, comprises a base plate 3 and two parallel side walls 4, between which a first bolt-shaped coupling member 5 and, at a predefined distance therefrom, a second bolt-shaped coupling member 6 are disposed for the detachable connection to the quick-change coupler device 1. The two bolt-shaped coupling members 5 and 6 can be inserted into and affixed in complementary bores in the side walls 4.

Figure 3:
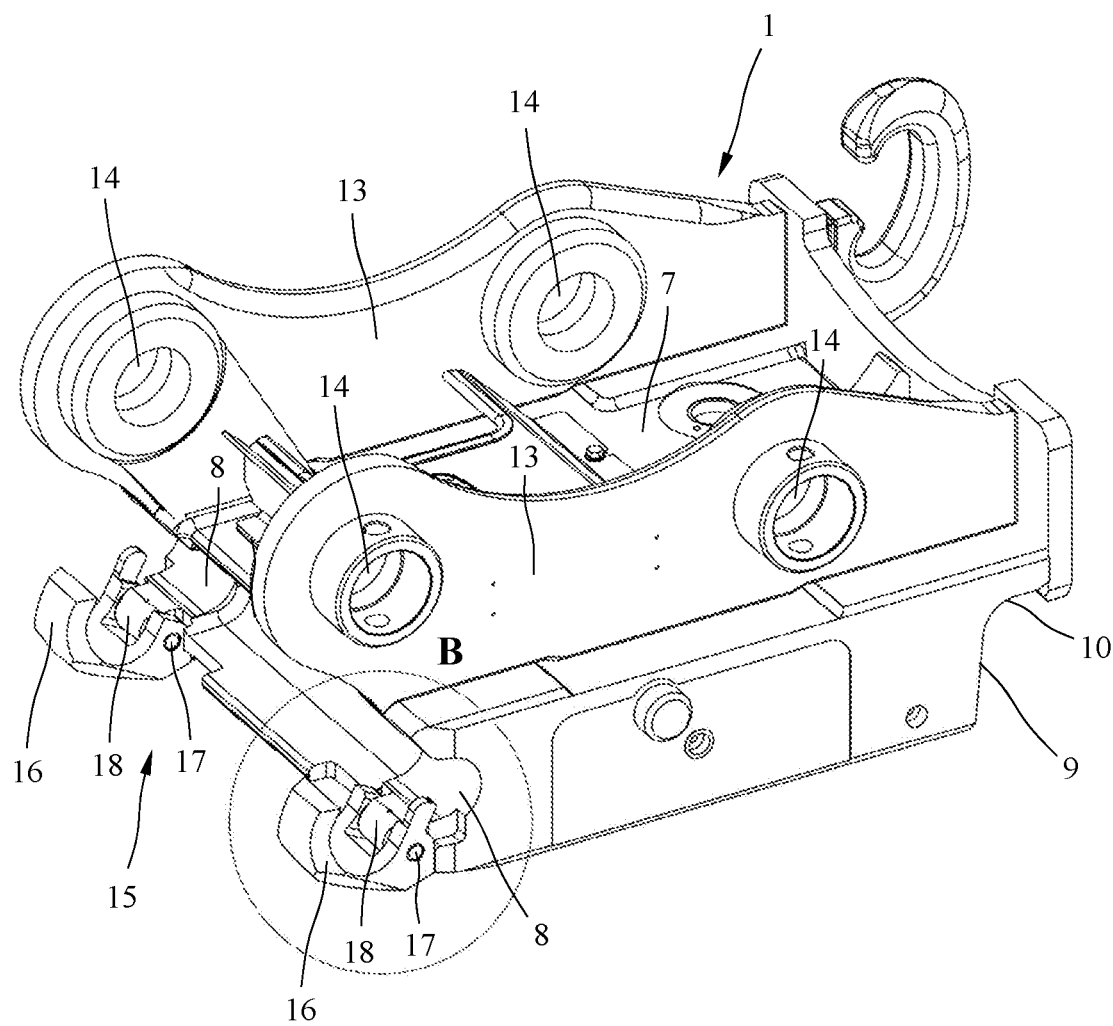
FIG. 3 the quick-change coupler device of FIG. 1 with the catch member in an open changeover position.
Figure 4:
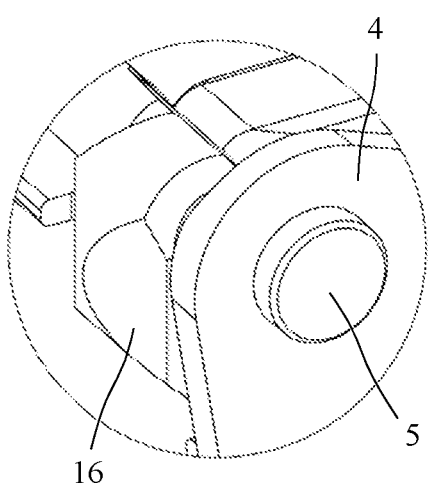
FIG. 4 an enlarged view of area A of FIG. 1.

The quick-change coupler device 1, which is also shown in a perspective view in FIG. 3, comprises a carrier assembly 7 in the form of a welded or cast component which, on one side, has rearwardly facing open first receiving members 8 for receiving and retaining the first bolt-shaped coupling member 5 and, on the other side, downwardly facing open second receiving members 9 for receiving and retaining the second bolt-shaped coupling member 6.

Figure 2:
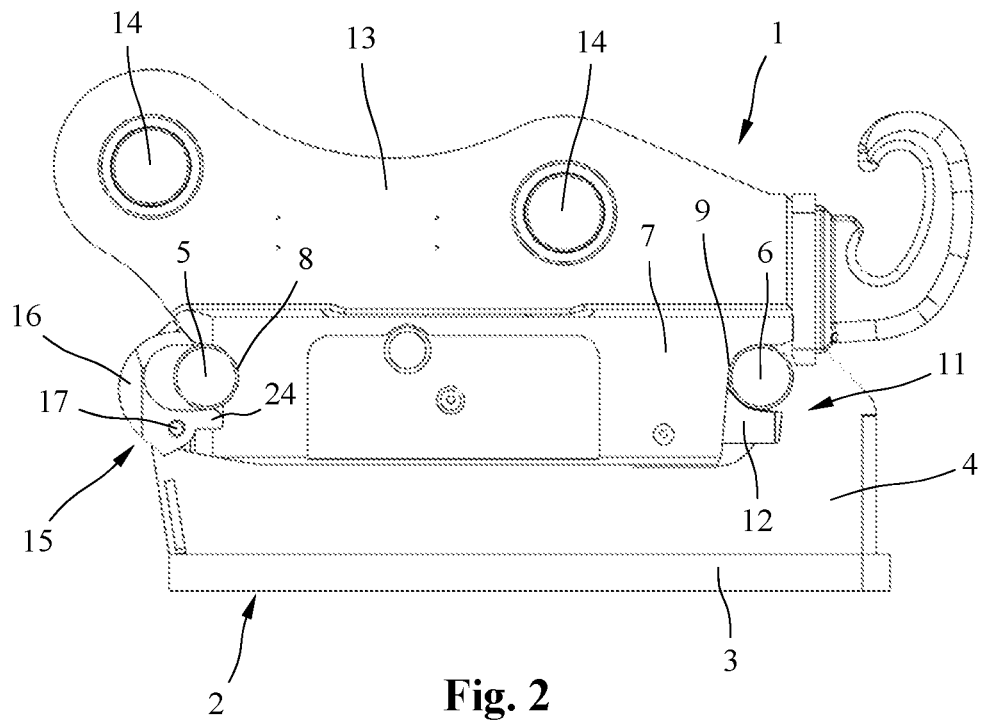
FIG. 2 the quick-change coupler system of FIG. 1 in a partially sectioned lateral view.

In the embodiment example shown, the quick-change coupler device 1 has two spaced apart receiving members 8 for receiving the first coupling member 5 on one side of the carrier assembly 7 and, on the other side, two receiving members 9 for receiving the second coupling member 6. The rearwardly facing open first receiving members 8 have a claw- or fork-shaped configuration. The downwardly facing open second receiving members 9 have a curved lower abutment surface 10 against which the second bolt-shaped coupling member 6 abuts. On the two receiving members 9, a locking unit 11 shown in FIG. 2 is disposed for retaining the second coupling member 6 in a locking position on the carrier assembly 7. In the embodiment shown, the locking unit 11, which can move between a release position and a locking position, comprises two bolt-shaped locking members 12 which are movably guided inside the carrier assembly 7 and which can be moved by a cylinder between a retracted release position for releasing or attaching the adapter 2 or an implement attachment and an extended locking position as shown in FIG. 2. In the extended locking position, the downwardly facing open second receiving members 9 are closed on the lower surface by the locking members 12 which are movably disposed in the guiding bores in the carrier assembly 7 so that the second bolt-shaped coupling member 6 is engaged from below by the bolt-shaped locking members 12.

On its upper surface, the carrier assembly 7 comprises two parallel side panels 13 in which patent openings 14 for mounting bolts (not shown) are disposed for mounting the quick-change coupler device 1 on a boom of an excavator or an implement attachment part of another construction site vehicle.

To attach an implement attachment by means of the quick-change coupler device 1, the quick-change coupler device 1, which, as a rule, is disposed on a boom of an excavator, is first moved such that the first coupling member 5, which is disposed on the adapter 2 or directly on the implement attachment, is retracted into the claw- or fork-shaped receiving members 8 on one side of the quick-change coupler device 1. Next, the quick-change coupler device 1, with the locking members 12 still in the retracted position, is swiveled about the first bolt-shaped coupling member 5 so that the second coupling member 6 on the adapter or implement attachment comes to abut the abutment surfaces 10 of the downwardly facing open receiving members 9 on the other side of the quick-change coupler device 1. Subsequently, the locking members 12, which are movably disposed in guiding bores in the carrier assembly 7 of the quick-change coupler device 1, can be hydraulically extended so that the second bolt-shaped coupling member 6 is engaged from below by the two locking members 12 on the quick-change coupler device 1 and the implement attachment is thereby retained on the quick-change coupler device 1.

To prevent an implement attachment that is coupled to the quick-change coupler device 1 from coming detached from the quick-change coupler device as a result of an unintentional release of the locking member caused by an operator error or malfunctions and from subsequently possibly dropping off while the quick-change coupler device is in a lifted position, a catch unit 15 is additionally disposed on the carrier assembly 7. The catch unit 15 is designed to surround and grasp the coupling member 5 which is disposed on the adapter 2 or the implement attachment and which engages in the first receiving members 8. The catch unit 15 is designed such that in the event that an implement attachment is unintentionally released from the coupling position, said implement attachment, as a result of the coupling member being engaged in the catch hook arrangement, is caught in a catch position and thereby retained on the quick-change coupler device.

In the embodiment shown, the catch unit 15 comprises two separate catch hooks 16 which are not rigidly disposed on the carrier assembly 7 of the quick-change coupler device 1, but instead are swivelably hinged about a transverse axis 17 on the carrier assembly 7 by means of a type of hinge. The two catch hooks 16 are disposed on the two posterior receiving members 8 and configured such that they surround and grasp a coupling member 5 on the adapter 2 or on an implement attachment and, in the event that the quick-change coupler device 1 is unintentionally released, are able to catch the implement attachment by causing the coupling member 5 to engage the catch hook 16 in a catch position. The swiveling configuration allows the catch hooks 16 to move between a folded-out position as shown in FIGS. 3 and 5 and a folded-in position as shown in FIGS. 6 and 7.

As especially well illustrated in FIG. 8, the carrier assembly 7 had rearwardly projecting connecting strips 18 with a patent cross bore 19 for connecting the catch hooks 16. The rearwardly projecting connecting strips 18 disposed on the carrier assembly 7 below the receiving members 8 jut out into a gap 20 between two legs 21 of the catch hook 16 which project forwardly in the direction of the carrier assembly 7. Disposed in the two legs 21 of the catch hook 16 are receiving bores 22 which are aligned with each other and which, in the mounted position of the catch hook 16, are coaxial with the cross bore 19 in the connecting strip 18. The horizontal transverse axis 17 is inserted into the cross bore 19 of the connecting strip 18 and secured by means of a pin 23 to prevent its falling out and becoming twisted.

Figure 5:
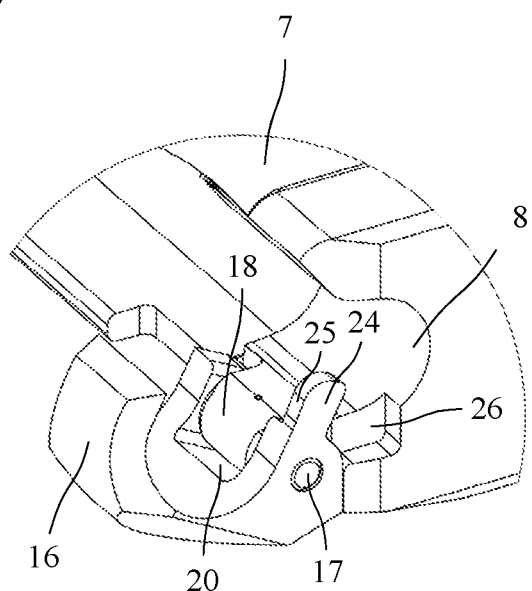
FIG. 5 an enlarged view of area B of FIG. 3.

Furthermore, as especially well illustrated in FIGS. 5 and 8, a control member 24 designed to be actuated by the first coupling member 5 is disposed on the catch hook 16. Via the control member 24, the catch hook 16, on engagement in the receiving member 8, can be moved by the coupling member 5 from the folded-out position shown in FIGS. 3 and 5 into the folded-in position shown in FIGS. 1 and 2. In addition, the control member 24 also ensures that the catch hook 16 can be moved into the folded-out position, in which a changeover can be made, only if the coupling member 5 is correctly positioned in the catch hook 16. In the embodiment shown, the control member 24 is configured in the form of an extension piece projecting in the direction of the first receiving member 8, with the control member having a control surface 25 which, in the folded-in position of the catch hook 16, is flush with the inside contour of the receiving member 8 and, in the folded-out position of the catch hook 16, projects inwardly relative to the inside contour of the receiving member 8. Disposed on the carrier assembly 7 is a lateral recess 26 for receiving the control member 25 when the catch hook 16 is in the folded-in position.

The catch hook 16 is configured such that it surrounds and grasps the coupling member 5 in the form of a semicircle over an angle of approximately 180°. This ensures an especially secure hold in any position of the quick-change coupler device 1. In the folded-in position of the catch hook 16, the receiving member 8 is rearwardly completely enclosed by the catch hook 16. In this folded-in position, the catch hook 16 also does not project particularly far out relative to the carrier assembly 7 so that the design is compact and the risk of potential collisions with an implement attachment is markedly reduced. Even if the coupling member 5 were to detach itself from the receiving member 8 and become caught by the catch hook 16, a secure hold would be ensured by the shape of the catch hook 16.

As FIG. 7 indicates, on its lower surface, the catch hook 16 has a stop surface 27 for abutting a front-end abutment surface 28 of the carrier assembly 7 below the receiving member 8. In its downwardly swiveled folded-out position, the stop surface 27 of the catch hook 16 abuts the abutment surface 28 of the carrier assembly 7 so that the catch hook 16 is retained in this lower catch position. On its upper end, the catch hook has an abutment surface 29 which in the upwardly swiveled folded-in position of the catch hook 16 comes to abut a complementary mating surface 30 of the carrier assembly 7.

The catch member 15 described above serves as an additional safety mechanism, by mean of which an implement attachment can be securely caught and retained even if the lock is unintentionally released. The catch unit 15 is independent of, and not connected to, the locking unit 11.

LIST OF REFERENCE CHARACTERS

1 Quick-change coupler
2 Adapter
3 Base plate
4 Side wall
5 First coupling member
6 Second coupling member
7 Carrier assembly
8 First receiving member
9 Second receiving member
10 Abutment surface
11 Locking unit
12 Locking member
13 Side panel
14 Opening
15 Catch unit
16 Catch hook
17 Transverse axis
18 Connecting strip
19 Cross bore
20 Gap
21 Leg
22 Receiving bore
23 Pin
24 Control member
25 Control surface
26 Recess
27 Lower stop surface
28 Abutment surface
29 Upper stop surface
30 Mating surface

The invention claimed is:

1. A quick-change coupler device for coupling and uncoupling implement attachments to and from construction site equipment, the device comprising:
a carrier assembly,
first receiving members disposed on one side of the carrier assembly for receiving a first coupling member,
second receiving members disposed on the other side of the carrier assembly for receiving a second coupling member,
a locking unit dedicated to the second receiving members and movable between a release position and a locking position, and
a catch unit disposed on the carrier assembly for catching the implement attachment,
wherein the catch unit comprises at least one catch hook which is swivel-mounted on the carrier assembly and on which a control member for controlling swivel movement of the at least one catch hook between a folded-in position, in which the at least one catch hook surrounds the first receiving members, and a folded-out position, in which the implement attachment can be changed, is disposed,
the control member is actuated independently of the locking unit, and
the control member is designed such that engagement of the first coupling member in the first receiving members actuates the control member so as to move the catch hook from the folded-out position into the folded-in position in which the catch hook surrounds the first coupling member that is engaged in the first receiving members.

2. The quick-change coupler device of claim 1, wherein the control member is configured in the form of an extension piece of the catch hook which projects in a direction of the first receiving members and which has an upper control surface for abutting the first coupling member engaged in the first receiving members.

3. The quick-change coupler device of claim 1, wherein the carrier assembly has a recess for receiving the control member when the catch hook is in the folded-in position.

4. The quick-change coupler device of claim 1, wherein the catch unit comprises two catch hooks which are swivelably disposed on the first receiving members of the carrier assembly.

5. The quick-change coupler device of claim 1, wherein the catch hook is designed in the form of a semicircle so as to, in the folded-in position, surround and grasp the first coupling member engaged in the first receiving members.

6. The quick-change coupler device of claim 1, wherein disposed on the lower surface of the catch hook is a stop surface for abutting a front-end abutment surface of the carrier assembly.

7. The quick-change coupler device of claim 1, wherein disposed on the upper end of the catch hook is an abutment surface for abutting a complementary mating surface of the carrier assembly.

8. The quick-change coupler device of claim 1, wherein the catch hook is swivel-mounted about a transverse axis on a connecting strip of the carrier assembly.

9. The quick-change coupler device of claim 8,
wherein the connecting strip comprises a cross bore, and
the catch hook comprises receiving bores for receiving the transverse axis.

10. The quick-change coupler device of claim 8, wherein the transverse axis is secured relative to the carrier assembly by a pin to prevent the transverse axis from falling out or twisting.

11. The quick-change coupler device of claim 8, wherein the connecting strip juts out into a gap between two projecting legs of the catch hook.

12. A quick-change coupler system comprising:
the quick-change coupler device of claim 1, and
an adapter coupleable to the quick-change coupler device.

13. The quick-change coupler device of claim 1, wherein the first coupling member initiates a swivel movement of the catch hook from the folded-out position into the folded-in position via actuation of the control member.

14. The quick-change coupler device of claim 1, wherein in the folded-in position, the catch hook of the catch unit securely retains the implement attachment so as to prevent the implement attachment from coming detached from the quick-change coupler device if the locking unit is unintentionally released from the locking position.

15. A quick-change coupler device for coupling and uncoupling an implement attachment to and from construction equipment, the device comprising:
a carrier assembly,
a first receiving member disposed on one side of the carrier assembly for receiving a first coupling member,
a second receiving member disposed on the other side of the carrier assembly for receiving a second coupling member,
a locking unit dedicated to the second receiving member and movable between a release position and a locking position, and
a catch unit disposed on the carrier assembly for catching the implement attachment,
wherein the catch unit comprises a catch hook which is swivel-mounted on the carrier assembly and on which a control member for controlling swivel movement of the catch hook between a folded-in position and a folded-out position is disposed,
in the folded-in position, the catch hook surrounds the first coupling member engaged in the first receiving member,
in the folded-out position, the implement attachment can be changed,
the control member is actuated independently of the locking unit, and
the control member is designed such that, on engagement of the first coupling member in the first receiving member, the first coupling member engages the control member so as to actuate the control member to move the catch hook from the folded-out position into the folded-in position in which the catch hook surrounds the first coupling member engaged in the first receiving member.

16. The quick-change coupler device of claim 15, wherein, in the folded-in position, the catch hook encloses the first receiving member that receives the first coupling member.

17. The quick-change coupler device of claim 15, wherein the control member ensures that the catch hook can be moved into the folded-out position only if the first coupling member is correctly positioned in the catch hook.

18. The quick-change coupler device of claim 15, wherein the catch unit further comprises a second catch hook which is swivel-mounted on the carrier assembly.

19. The quick-change coupler device of claim 15, wherein the catch unit is designed such that, if the locking unit is released from the locking position when the catch hook is in the folded-in position, the catch hook surrounding the first coupling member retains the implement attachment on the quick-change coupler device.

20. A quick-change coupler device for coupling and uncoupling an implement attachment to and from construction equipment, the device comprising:
a carrier assembly,
a first receiving member disposed on one side of the carrier assembly for receiving a first coupling member,
a second receiving member disposed on the other side of the carrier assembly for receiving a second coupling member,
a locking unit dedicated to the second receiving member and movable between a release position and a locking position, and
a catch unit disposed on the carrier assembly for catching the implement attachment,
wherein the catch unit comprises a catch hook which is swivel-mounted on the carrier assembly and on which a control member for controlling swivel movement of the catch hook between a folded-in position and a folded-out position is disposed,
in the folded-in position, the first receiving member is rearwardly completely enclosed by the catch hook,
in the folded-out position, the implement attachment can be changed,
the control member is actuated independently of the locking unit, and
the control member is designed such that the first coupling member engaging in the first receiving member initiates, via actuation of the control member by the first coupling member, movement of the catch hook from the folded-out position into the folded-in position in which the first receiving member is rearwardly completely enclosed by the catch hook.

\* \* \* \* \*